US005399380A

United States Patent [19]

Goodson et al.

[11] Patent Number: 5,399,380

[45] Date of Patent: Mar. 21, 1995

[54] BONDING OF TWO ELASTOMERIC MATERIALS BY MEANS OF ISOCYANATE VAPORS

[75] Inventors: Forrest R. Goodson; Donald L. Knaresboro, both of San Jose, Calif.

[73] Assignee: United Technologies Corporation, Hartford, Conn.

[21] Appl. No.: 165,279

[22] Filed: Dec. 10, 1993

[51] Int. Cl.[6] .......... B05D 3/04

[52] U.S. Cl. .......... 427/255.6; 427/412.1; 427/333

[58] Field of Search .......... 427/255.6, 407.1, 412.1, 427/333

[56] References Cited

U.S. PATENT DOCUMENTS

| | | | |
|---|---|---|---|
| 2,783,164 | 2/1957 | Hill | 117/71 |
| 2,914,424 | 11/1959 | Murray | 117/106 |
| 3,561,920 | 2/1971 | Kinter et al. | 23/191 |
| 3,607,365 | 9/1971 | Lindlof | 117/100 R |
| 3,703,353 | 11/1972 | Kusterer, Jr. et al. | 21/58 |
| 3,716,604 | 2/1973 | Dehm | 264/3 R |
| 4,429,634 | 2/1984 | Byrd et al. | 102/290 |
| 4,764,398 | 8/1988 | Croitoru et al. | 427/237 |
| 4,820,591 | 4/1989 | Ramanarayanan | 428/628 |
| 4,879,140 | 11/1989 | Gray et al. | 427/38 |

*Primary Examiner*—Shrive Beck
*Assistant Examiner*—Erma Cameron
*Attorney, Agent, or Firm*—Alan C. Cohen

[57] ABSTRACT

The bond strength between an elastomeric material and a secondary material is improved by applying a coating of isocyanate onto the surface of the elastomeric material prior to bonding the secondary material to the surface of the elastomeric material. The isocyanate is applied to the surface of the elastomeric material by exposing the elastomeric material to an atmosphere containing isocyanate vapor which is substantially uniformly distributed throughout the atmosphere and causing the isocyanate to deposit onto the surface of the elastomeric material. Then casting a second material onto the isocyanate coated surface.

14 Claims, 1 Drawing Sheet

22
20
24
18
10
12
14
16

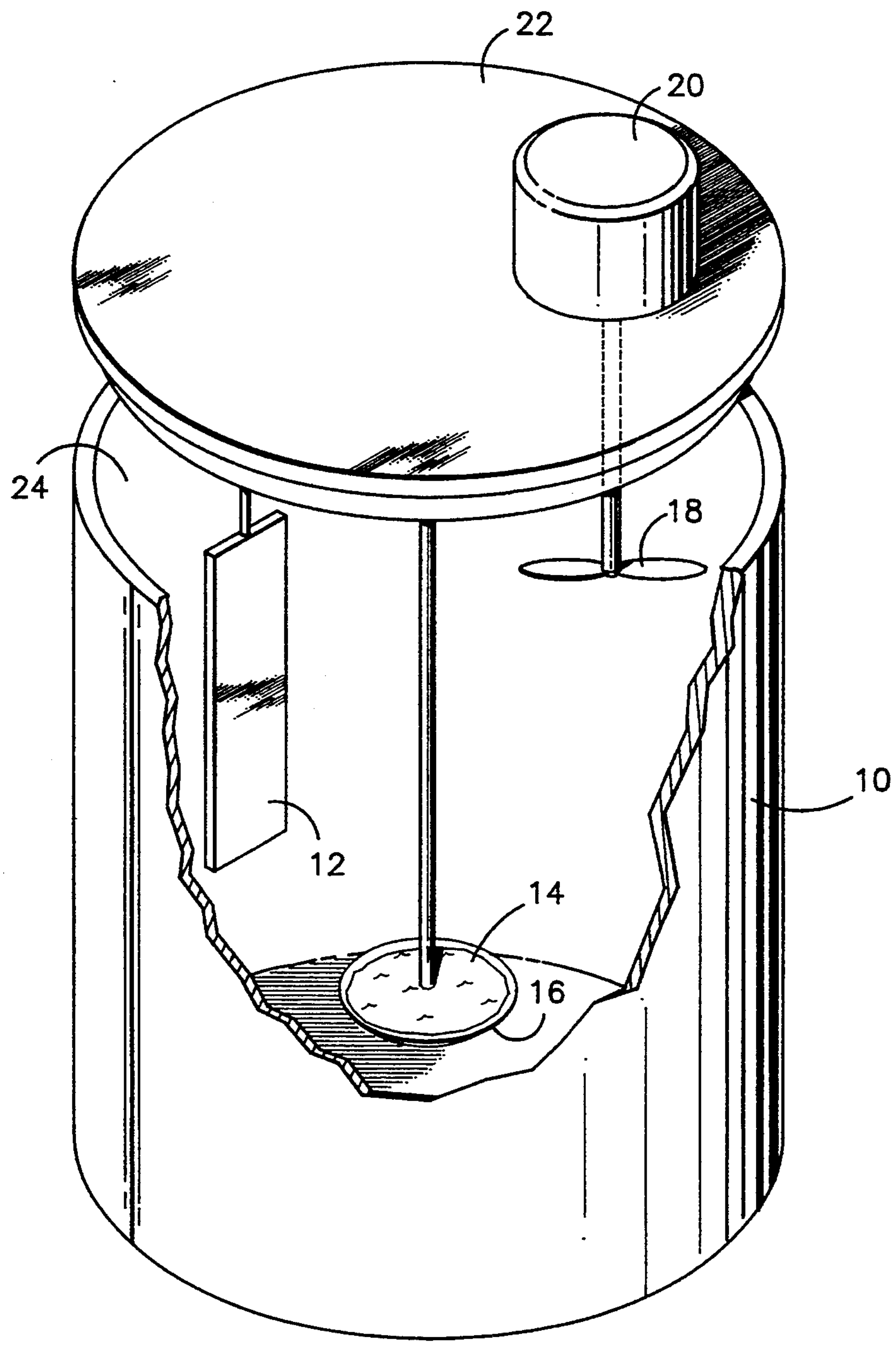
22
20
24
18
10
12
14
16

BONDING OF TWO ELASTOMERIC MATERIALS BY MEANS OF ISOCYANATE VAPORS

TECHNICAL FIELD

The technical field to which this invention pertains is bonding elastomeric materials.

BACKGROUND OF THE INVENTION

The following processes are typical of the manufacture of a solid propellant rocket motor: (1) fabrication of the motor case, (2) insulation of the interior of the case, (3) application of a "liner" to the surface of the insulation to ensure bonding to the propellant grain, (4) casting of the uncured propellant into the motor and against the liner, and (5) curing the propellant grain.

The motor case, which serves as a pressure vessel, is constructed of lightweight material (metal or fiber composite) that provides adequate strength only at relatively low temperature. The function of the insulation is to protect the case from being weakened by exposure to the hot gases formed during combustion of the solid propellant. Generally the insulation is applied to the interior of the motor case in the form of an uncured elastomeric material such as ethylene-propylene (EPDM) or nitrile rubber containing particulate, solid, refractory filler. The insulation is then cured, generally under pressure by application of moderate heat.

The composition of the liner and techniques for its application depend in part on the nature of the insulation but mainly on the composition of the propellant that will be cast against it. These matters are discussed in greater detail below.

The uncured propellant typically consists of a viscous suspension of particulate solids (e.g., ammonium perchlorate oxidizer, nitramines, powdered aluminum fuel, and minor amounts of combustion modifiers) in a curable elastomeric binder (e.g., Hydroxy terminated polybutadiene). After casting, the propellant is cured, usually for about one week at temperatures below about 70° C. During cure the propellant becomes a strong, elastic solid that adheres tightly to the liner-coated insulation.

The rate at which combustion gases are formed during burning of the propellant grain is proportional to the area of the grain that is exposed. In turn, the chamber pressure depends on the balance of volume of gases generated and gases discharged through the rocket nozzle. Thus, to achieve the designed pressure/thrust history, and particularly to avoid catastrophic overpressure, it is essential that during combustion the propellant grain remain securely bonded to the insulator wherever they are in contact. The bond must be strong in tension and resistant to peeling.

Such bonding is achieved by application of an adhesive liner to the surface of the insulation prior to casting the uncured propellant. The adhesive liner may take the form of a thin layer of filled, curable, liquid elastomer (commonly the same elastomer that is used as the binder of the propellant) or, alternatively, a thinner, unfilled liquid layer consisting of a diluted or undiluted polyfunctional substance capable of bonding chemically to the elastomeric binder of the propellant. In the case of a hydroxy-functional binder, such as hydroxyl terminated polybutadiene (HTPB), the substance of choice is a polyfunctional isocyanate similar or identical to the binder curative of the propellant formulation.

Typically liners are applied to the insulation mechanically, i.e., by brushing or spraying. Neither technique permits precise control of liner thickness and hence the properties of the resulting bond. Further, spraying requires that the liner formulation be of low viscosity, and this generally requires addition of a diluent. Suitable diluents are either flammable (e.g., hydrocarbons, ketones, and esters) or environmentally hazardous (halohydrocarbons).

Therefore, what is needed in this art is a method for improving the means of bonding propellant to insulation to achieve a high-quality, uniform bond without incurring fire or environmental hazards.

DESCRIPTION OF THE INVENTION

The present invention is a method of applying an isocyanate onto the surface of an elastomeric material to enhance the bond strength between the elastomeric material and a curable secondary material. The method comprises exposing the surface of a cured elastomeric material to vapor of a isocyanate and thereby causing the isocyanate to deposit onto the surface of the elastomer in a uniform manner.

A further object of the invention is a cured elastomeric surface having deposited on it a uniform layer of an isocyanate material.

DESCRIPTION OF THE DRAWING

The Figure is a cross sectional view of the apparatus used in one method for carrying out the invention.

BEST MODE FOR CARRYING OUT THE INVENTION

Although the present invention is directed toward improving the bond strength between an elastomeric insulating layer and a curable solid rocket propellant, it is not intended to be so limited. It is contemplated that other uses for this invention would be apparent to one of ordinary skill where there is a desire to improve the bond strength between an elastomeric material and a secondary material.

The present invention discloses a method for applying a very thin layer of an isocyanate, preferably a polyfunctional isocyanate, uniformly onto the surface of a cured elastomeric material. This layer increases the strength of the bond between the elastomeric surface and a secondary material. This is of particular importance in the preparation of solid propellant rocket motors as described in the Background of the Invention section above. The cured insulating layer which is to be bonded can be any filled or untilled elastomeric material including open cell or closed cell foams comprised of hydrocarbon rubbers, polyurethanes, and polyesters. The material used most commonly as insulators for solid rocket motors are ethylene propylene diene terpolymer and nitrile rubber. These are commonly filled with various refractory particulate materials such as silica, carbon black, or fibrous material (such as the aramid fiber Kevlar ®). The particular elastomer and filler selected and the method of preparing the insulating layer would be determined by the specific physical requirements necessary in a particular application and would be chosen by one skilled in that art.

The method comprises exposing the surface of the cured elastomeric material to an atmosphere containing a uniform concentration of a monofunctional or polyfunctional isocyanate (hereafter referred to as isocyanates) vapor inside a closed vessel. In those instances where one is preparing a rocket motor, an insulated rocket motor case can serve as its own closed vessel. Before vaporization the liquid or solid isocyanate resides in an open reservoir within the closed vessel. As the isocyanate evaporates, its vapor contacts the elastomeric surface, and is deposited onto the surface much more uniformly than is possible by manual application.

In those instances in which the isocyanate has a high vapor pressure, it may be possible to permit the isocyanate to evaporate at room temperature. However, in the case where the isocyanate has an intrinsically low vapor pressure or one wishes to speed up the vaporization process and decrease the time it takes to deposit the isocyanate on the surface of the elastomer, it is possible to increase the rate of vaporization of the isocyanate through the application of heat directly to the reservoir or indirectly by raising the temperature of the atmosphere in the containing vessel.

Because the vapor of the isocyanate is more dense than the surrounding atmosphere, it tends not to diffuse uniformly throughout the treatment vessel. In order to ensure the uniform distribution of the vapors, resulting in the uniform deposition of the isocyanate, the vapor is distributed throughout the vessel by causing the atmosphere inside the vessel to circulate. It has been found that by using a small fan placed inside the vessel the vapors can be evenly distributed over the surface of the elastomer. However, other techniques that will aid in evenly distributing the isocyanate vapor throughout the vessel could be used.

The particular monofunctional or polyfunctional isocyanate used is not critical so long as it is capable of being converted to a vapor state. Generally, such isocyanates are liquids. However, solid isocyanates can also be used if they have the requisite ability to change to the vapor state at conveniently low temperature. Typically, this translates into isocyanates having a molecular weight of 600 or below. Generally, those isocyanates having molecular weights above 600 are insufficiently volatile to be suitable for use in the present invention. Representative isocyanates that are suitable for use in this method are listed below:

methyl isocyanate
ethyl isocyanate
propyl isocyanate
isophorone diisocyanate
hexamethylene diisocyanate
toluene diisocyanate
metaphenylenediamine diisocyanate
metaxylene diisocyanate These materials may be used individually or as a mixture depending on their compatibility with each other and with the materials being bonded. Such compatibility may be determined through simple experimentation.

The precise physico-chemical state of the deposited isocyanate is unknown. It is believed that the isocyanate vapors are adsorbed, absorbed or diffused into the surface of the elastomeric substrate. Nevertheless, it has been observed that the present method provides a uniform distribution of isocyanate on the elastomeric surface that markedly improves bonding. The amount of isocyanate to be applied to the surface depends in some degree on the elastomeric material being bonded, however, normally between about 0.001 gm/sq. cm to about 0.1 gm/sq. cm is adequate. In order to control the amount of material actually deposited onto the surface of the elastomer, first one calculates the total surface to be treated and then computes the amount of coating desired per unit area. The product of these two values yields the amount of isocyanate to be placed in the reservoir. Because the isocyanate will be uniformly deposited onto the surface of the elastomeric substrate, one need only wait until all of the isocyanate is evaporated from the reservoir to be assured that the desired deposit has been achieved. Naturally alternative methods may be used to introduce the isocyanate vapors. However, the concentration of isocyanate introduced into the vessel would be the same. Once the isocyanate has been deposited onto the surface of the cured elastomeric material the uncured elastomer is introduced onto the coated surface and caused to cure. The following experiments demonstrate the improved results achieved by using the process of the present invention.

The Figure depicts the apparatus used to prepare the materials used in the experiments set forth below. A cylindrical vessel 10, made of stainless steel and having the dimensions of nine inches deep by eight inches in diameter was used to contain the suspended specimens 12 of rocket motor insulation and the isocyanate vapor. The vapor to be deposited onto the surface of the elastomeric substrate was produced by merely placing a reservoir 14 of the liquid isocyanate inside the vessel 10. The reservoir 14 consisted of a shallow stainless steel dish 16 having a diameter of two inches. The isocyanate was then caused to vaporize and diffuse throughout the vessel eventually contacting and being deposited onto the surface of the elastomeric material specimens 12 by heating the vessel to a temperature of 140° F. for periods ranging from 4 to 72 hr by placing the vessel into a preheated oven, circulating hot air oven. A small fan 18 placed within the vessel was used to circulate the atmosphere and ensure uniform distribution of the isocyanate vapors and was operated via a motor 20. The vessel was sealed by applying the top 22 to the opening 24 in the top of the vessel 10 to retain the isocyanate vapors within the vessel itself.

EXPERIMENT 1

A control specimen 7.5 inches×5 inches×0.1 inch thick of Kevlar®-filled EPDM rocket motor insulation was prepared by brushing one surface in the normal prior art manner with [neat] hexamethylene diisocyanate to provide a coating of 2 mg/sq. cm. Another 7.5×5×0.1 inch specimen of the insulation was coated by the method of the present invention as follows. The specimen was suspended in the treatment vessel and the reservoir was filled with 4.48 gm of hexamethylene diisocyanate. The vessel was closed, the fan was started, and the entire assembly was heated to 140° F. and maintained at that temperature for 24 hours to give a coating of 1.5 mg/cm$^2$. Both the vapor-treated specimen and the control specimen were then placed in a retention fixture, and uncured HTPB propellant was cast onto the treated surfaces. The cast specimens were cured at 140° F. for 168 hours, cooled to room temperature, and then machined into specimens of one inch square cross-section for tensile strength measurement and 1×4 inch cross-section for peel strength measurement using an Instron tensile testing apparatus. Strength of the bond was measured at room temperature using a crosshead speed of one inch per minute for the tensile specimens and five inches per minute for the peel specimens with the following results.

| Coating Method | Tensile Strength, lb./sq. inch | Peel Strength, lb./linear inch |
|---|---|---|
| Brush | 160 | 4.0 |
| Vapor Deposit | 201 | 6.2 |

This represents a 25% increase in the tensile strength and a 55% increase in the peel strength of the present invention's bond over the brush application bond.

EXPERIMENT 2

Test specimens of the size used in Experiment 1 were prepared of silica-filled ethylene propylene diene terpolymer rocket motor insulation. Neat hexamethylene diisocyanate was brushed onto the surface of a control specimen to provide a coating of 2 $mg/cm^2$. Another specimen was suspended in the treatment vessel as in Experiment 1. One gram of hexamethylene diisocyanate was placed in the reservoir inside the vessel. The vessel was closed, the fan was started, and the entire assembly was heated to 140° F. and maintained at that temperature for 24 hours to provide a coating of 2.3 $mg/cm^2$. Propellant was cast on the treated specimens, and both tensile and peel test specimens were prepared and tested as described in Experiment 1 with the following results.

| Coating Method | Tensil Strength, lb/sq. inch | Peal Strength, lb./linear linch |
|---|---|---|
| Brush | 140 | 3.1 |
| Vapor Deposit | 165 | 4.8 |

These results show that the vapor deposition method provides an 18% increase in the tensile strength and a 55% increase in the peel strength over the prior art brush application.

EXPERIMENT 3

Silica-filled ethylene propylene diene terpolymer rocket motor insulation specimens of the same type as those used in Experiment 2 were prepared using toluene diisocyanate. The control specimen was brush coated at an isocyanate concentration of (2 mg/sq. cm). The other specimen was vapor coated as previously described to provide an isocyanate concentration of 1 mg/sq. cm. Tensile and peel specimens were prepared by casting a nitrate ester-plasticized propellant, and machining tensile test specimens as described previously. Testing of the specimens gave the following results.

| Coating Method | Tensile Strength, lb./sq. inch |
|---|---|
| Brush | 60 |
| Vapor Deposit | 77 |

Although this represents only 12% increase in the tensile strength afforded by the vapor deposition process, it demonstrates applicability of the method to a quite different type of propellant, i.e., one based on a highly plasticized polyether binder as distinguished from the hydrocarbon (polybutadiene) binder used in Experiments 1 and 2.

The novel method set forth herein provides an inexpensive and safe method for applying an isocyanate liner to a cured elastomeric surface in preparation for that surface to be bonded to a second material.

As may be seen by the experiments set forth above it is apparent that the bond strengths achieved for bonds between two elastomeric materials can be greatly and unexpectedly enhanced using the present method for depositing the isocyanate as a vapor over the prior art methods. It is believed that the method improved the bond strength because of the uniformity of deposition and the likelihood that the vapor is able to more effectively penetrate or become absorbed or an integral part of the surface layer of the elastomeric material on which it is deposited than through application pursuant to the prior art method.

It is claimed:

1. A method of improving the bond strength between two elastomeric materials comprising;

exposing the surface of a cured elastomeric material to an atmosphere containing a substantially uniform distribution of isocyanate vapor, thereby causing the isocyanate vapors to deposit on the elastomeric surface creating an isocyanate coated surface, contacting the isocyanate coated surface with an uncured elastomeric material and causing the uncured elastomeric material to cure thereby bonding the two elastomeric materials together.

2. The method of claim 1 wherein the isocyanate is deposited at a concentration of about 0.001 gm/sq. cm to about 0.1 gm/sq. cm.

3. The method of claim 1 wherein the isocyanate is a polyfunctional isocyanate.

4. A method for bonding an elastomeric insulating layer to an solid rocket propellant comprising;

coating the inside of a rocket motor chamber with an elastomeric insulating layer, curing the elastomeric insulating material, exposing the cured elastomeric insulation to an atmosphere containing a substantially uniform distribution of an isocyanate vapor, thereby depositing a layer of isocyanate onto the surface of the elastomeric insulating layer creating an isocyanate coated surface, introducing an uncured propellant having a curable elastomeric binder into the motor chamber and causing the elastomeric binder to contact the isocyanate coated elastomeric insulating layer.

5. The method of claim 4 wherein the isocyanate is introduced into the rocket motor chamber as a liquid.

6. The method of claim 4 wherein the liquid is heated to cause it to change to the vapor state.

7. The method of claim 4 wherein the isocyanate is a polyfunctional isocyanate.

8. The method of claim 4 wherein the elastomeric propellant is cured using a polyfunctional isocyanate.

9. The method of claim 1 wherein the isocyanate vapors are distributed substantially uniformly throughout the atmosphere by a circulation means.

10. The method of claim 9 wherein the circulation means is a fan.

11. The method of claim 1 wherein the isocyanate is selected from the group consisting of methyl, ethyl or propyl isocyanate, isophorone diisocyanate, hexamethylene diisocyanate, toluene diisocyanate, metaphenylenediamine diisocyanate, and metaxylene diisocyanate or a mixture thereof.

12. The method of claim 1 wherein the isocyanate has a molecular weight of 600 or less.

13. The method of claim 3 wherein the isocyanate is deposited at a concentration of about 0.001 gm/sq. cm to about 0.1 gm/sq. cm.

14. A method for preparing a surface of a cured first elastomeric material for bonding to a second uncured elastomer comprising exposing the surface of the cured elastomeric material to an atmosphere containing a substantially uniform distribution of polyfunctional isocyanate vapor, thereby causing the isocyanate vapors to deposit on the surface of the cured elastomeric material.

* * * * *